33-268. OR A1 289 SR
F. YEISER.
A I
Altitude Instrument.
No. 289. A. I. Patented July 17, 1860.
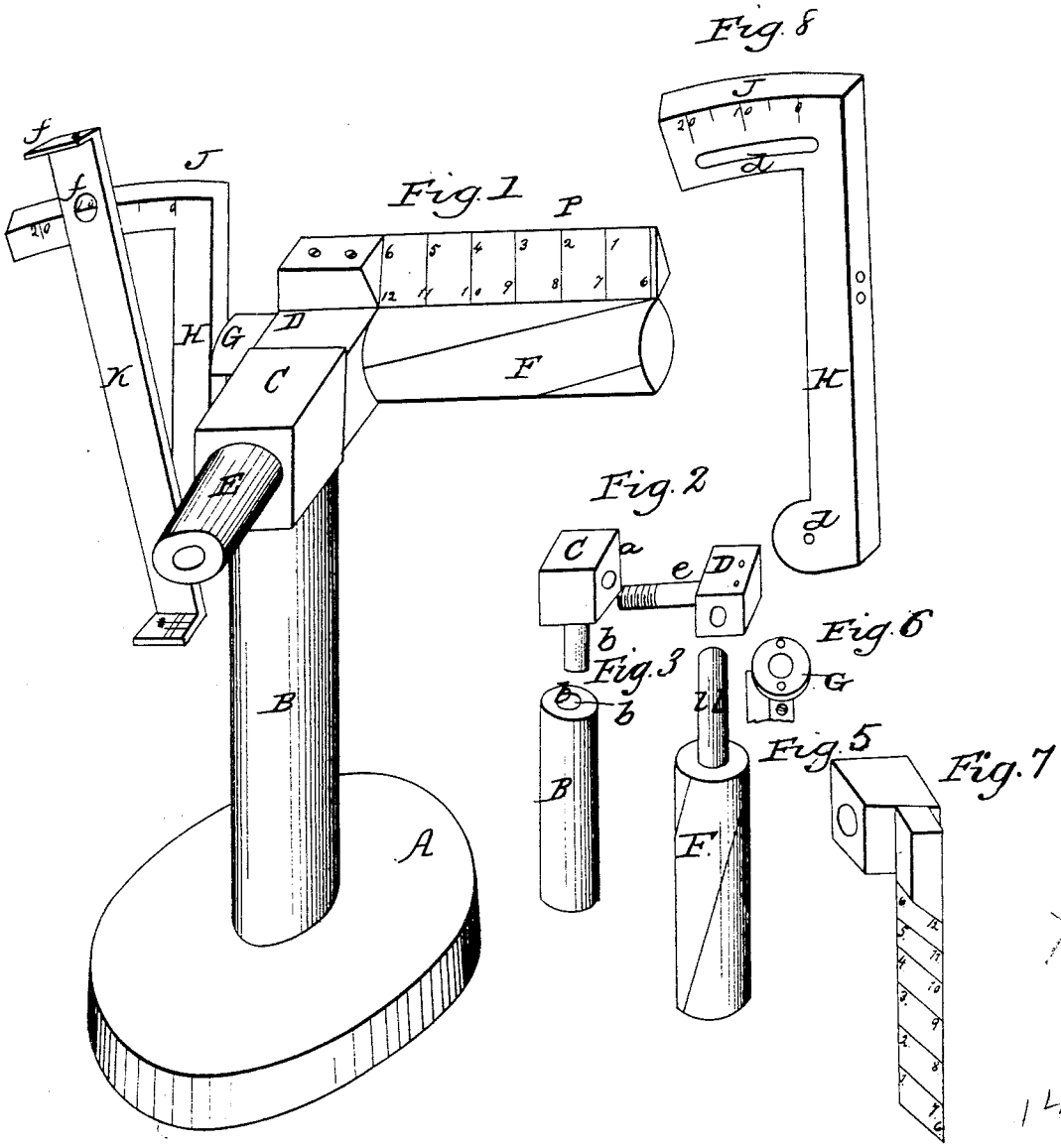
33/268
X 33/271
1464
X 1449
N. PETERS, Photo-Lithographer, Washington, D. C.
2P